Patented Nov. 3, 1936

2,059,260

UNITED STATES PATENT OFFICE 2,059,260

REACTIVE COMPOUNDS OF UNSATURATED OIL AND PROCESS OF PRODUCING THE SAME

James Scott Long, Coopersburg, Pa., and George F. Beal, Minneapolis, Minn., assignors to Archer-Daniels-Midland Company, a corporation of Delaware No Drawing. Application August 16, 1935, Serial No. 36,559

6 Claims. (Cl. 260—2)

This invention relates to the production of a new class of synthetic compounds consisting essentially of the reaction products of fatty acids having from 16 to 24 or more carbon atoms, and aromatic bodies. The fatty acids may be combined with polyhydric alcohols to form esters, for according to this invention, the aromatic bodies are combined at the points where the double bonds existed in the fatty acid chains and not at the end of the chains. It is further a characteristic of our process that the products can be purified to form substantially clear viscous liquids, though of course such complete purification is not always an essential for commercial operations.

In carrying out this process, we may use as a starting point the natural oils consisting essentially of the glycerides of unsaturated fatty acids, such for example, as linseed oil, soybean oil, cotton seed oil, olive oil, perilla oil and neat's-foot oil. In addition we may, as stated, use the unsaturated fatty acids themselves or synthetic esters thereof with polyhydric alcohols. There is just one point to be observed and that is that we cannot use compounds, as typified by tung oil, which consist largely of fatty acids containing conjugated double bonds. The reasons for this are set forth hereafter.

In carrying out our process, the fatty acid chains are made to combine with aromatic bodies in the presence of relatively large quantities of anhydrous aluminum chloride. We believe the combination is similar to the Friedal and Craft reaction, though there is some intimation in the literature to the effect that this reaction is not applicable to bodies such as we use. In any event, we find that we can cause to react with the fatty acids any of the aromatic bodies which can be caused to react with aliphatic hydrocarbons in accordance with the Friedel and Craft reaction. This class of aromatics is well understood by chemists, but by way of example we may include such polar aromatic bodies as phenol, cresol, resorcinol, aniline or the like and also non-polar aromatics such as benzene, xylene and toluene. The latter class of products can, if desired, subsequently be converted into more reactive bodies by chlorination, nitration, or similar well-known processes.

In general, the products resulting from our process are of an oily nature and are intermediates of great value for further synthesis, for they can be reacted upon by a great number of different bodies to produce valuable products of large molecular size. The fact that our process permits us to obtain the desired compounds in a form capable of purification is of particular importance for such synthetic production. A very simple illustration of further reaction of our products is in the case where phenol is caused to combine with a drying oil and subsequently the resulting oil is reacted with formaldehyde to form a resinous body. In general, resinous bodies of this type made according to our process are soluble in organic solvents such as xylene or lacquer thinners, and when applied to wood or metal they yield, after evaporation with solvent, tough, adherent and flexible films of great protective value.

If aluminum chloride in small amounts, say from 1 to 2%, is added to a natural drying oil of the type referred to, the oil darkens without any material thickening. As the proportion of aluminum chloride is increased, it becomes apparent that a definite reaction takes place, and when appreciable quantities of aluminum chloride are added, a violent reaction sets in. If the amount of aluminum chloride is unduly increased, the oil will be charred and destroyed. This is true of the various oils specified, but is not true of tung oil or other oils having conjugated double bonds, for when aluminum chloride, even in proportions as low as 3%, is added to tung oil, a dry, solid gel will be formed which is very different from the common oil gels and this gel will persist even if relatively large amounts of other bodies such as phenol are present. The formation of the gel apparently prevents the desired reaction from taking place. It is our belief that the reaction which takes place when aluminum chloride is added to a drying oil, other than an oil such as tung oil having conjugated double bonds, is similar to a Friedel and Craft reaction in that the combination takes place at the points from which HCl is split off. Where the aluminum chloride is simply added to the oil, such combination apparently is between different molecules of the oil or between two chains of the same oil molecule. In any event, large quantities of hydrochloric acid are liberated and a gummy mass is formed whose properties depend upon the amount of aluminum chloride used.

If phenol or other aromatic compound is present when this reaction takes place, a new set of conditions is created. The oil molecules, as before, tend to react between themselves, forming thick gummy masses, but we find that the aromatic compound also has a tendency to react with the oil. The reaction takes place very rapidly, and gummy masses are formed which tend to enmesh the aluminum chloride. Finally the mass becomes so thick that it cannot easily be agitated and the action of the aluminum chloride is prevented, even though a large excess is used. As the amount of aromatic body is increased, the amount that will be combined with the oil continues to increase, but the oil-to-oil reaction tends to persist because the aromatic molecule is ordinarily much smaller than the oil molecule and apparently reacts only at the double bonds which are found at only a very small amount of the total surface of the oil molecule. The probability of an aromatic molecule being sufficiently close to a double bond to react is therefore very small, unless there are many molecules of the aromatic compound present per molecule of oil. Thus as the amount of aromatic compound is increased, it not only supplies an additional number of molecules to go into the combination, but also acts as a diluent of the oil to keep the oil molecules apart so that if enough of the aromatic compound is used, substantially all of the oil molecules will be combined with one or more aromatic bodies. Solvents, preferably volatile and inert, such for example as ether, can also be used as a diluent for this purpose and such use may add greatly to the process.

As stated, the evidence all points to this combination being the result of the Friedel and Craft reaction according to which the aluminum chloride breaks up to cause hydrogen chloride to combine with the unsaturated bodies at the double bonds following which the chlorine reacts with a hydrogen atom of the aromatic body liberating hydrochloric acid and effecting a combination between the aromatic body and what was formerly the double bond. Thus we have noted that a violent reaction occurs with an evolution of hydrochloric acid; a gummy mass is produced as an intermediate product, and this gummy mass can be hydrolyzed and aluminum removed in the form of a soluble sulphate or chloride. Further, this hydrolysis is accompanied by an evolution of heat. All of these results are typical of reactions which are known to be of Friedel and Craft's type, and it is a characteristic of our process that there shall be an actual evolution of hydrochloric acid and a change in the product from a gummy mass to an oily state after the mass is hydrolyzed and the aluminum removed. In these regards our process is definitely distinct from processes where substances such as aluminum chloride are simply used as a catalyst.

From the foregoing discussion, it will be seen that in order to produce the desired result, substantial quantities of aluminum chloride must be used,—far more being necessary than the small percentage that would be employed if it were present only as a true catalyst and not entering directly into the reaction. In general, it is advisable to have at least one molecule of the anhydrous aluminum chloride (AlCl₃) for each unsaturated fatty acid chain in the oily material to be treated. Since the drying oils contain certain proportions of saturated fatty acids, some adjustment may be made on this account but in any event it is highly important that we have present an amount of aluminum chloride equal to at least 20% by weight of the oil used. In general, this proportion should exceed 40% by weight. At the high end, there is no particular limit of the amount of aluminum chloride except that if too great an amount is employed it will tend to char the oil.

In ordinary case it is necessary to have a substantial excess of the aromatic body but we find that apparently one of the functions of such excess is to act as a diluent to prevent the oil-to-oil reaction and therefore it is advisable to have oil reaction and therefore it is advisable to have present a volatile, inert solvent which can readily be removed. In such case if temperature conditions are properly controlled, substantially all of the aromatic compound can be combined.

One of the essential requirements, where something approaching a quantitative reaction is to be had, is that the temperature must be kept low, particularly during the early stages of reaction, and the aluminum chloride should be added slowly while agitating. We have obtained the best results by temperatures below 10° C. and we have found that it is quite important that the temperature should not be permitted to rise above about 35° C. during the early stage of the reaction, that is, at least until there has been a substantial evolution of HCl. In practice, it is somewhat preferable to add the aluminum chloride to the aromatic compound and later incorporate these with the oil, but this is not essential.

The nature of the product can be modified both by the change in the starting ingredients such as the oil or ester or fatty acid and aromatic compound selected and also by the relative proportions both of the aromatic compound and the aluminum chloride.

In carrying out our invention, we find it advantageous to distill off as much of the free hydrochloric acid formed as is practicable and then to prevent further reaction by the addition of dilute hydrochloric or sulphuric acid. The gummy mass then breaks down to a thick oil as the soluble aluminum compounds are washed out, following which the excess of the aromatic body is preferably distilled off. If the washing and distillations have been carefully conducted, the resulting product will ordinarily be clear, though showing a relatively deep color which may range from red to green.

The product of this reaction apparently consists of a more or less polymerized oil with aromatic radicals combined with the oil molecules. The aromatic radicals retain their ability to be reacted on so that this intermediate product can be used as a foundation for further synthesis. Thus if phenol or one of its homologues has been used as the aromatic, the intermediate oil will condense with formaldehyde to form resinous bodies. As usual with such a condensation, some catalyst should be present and the nature of the final product will vary depending upon the catalyst used and the amount of formaldehyde and time and temperature of treatment. If the catalyst is acid, the resins tend to be dark colored, whereas, the basic catalysts tend to produce light colored resin. These resins ordinarily are soluble in certain of the organic solvents and appear to have very valuable qualities for varnishes and similar purposes.

The following examples are given as illustrating the manner in which our invention is carried out and the type of product that may be produced:

1. 560 parts by weight of phenol were melted and dissolved in 280 parts of linseed varnish oil. To this solution 135 parts by weight of aluminum chloride were added in small amounts, the reaction vessel being cooled with cold water. A vigorous evolution of hydrochloric acid ensued and the mixture became a very deep dark red color. After the reaction caused by the addition of the aluminum chloride had subsided, the mixture was heated on a water bath until there was no further evolution of hydrochloric acid.

The material, which was now a thick, gummy mass, was allowed to cool and about 1200 parts of 20% hydrochloric acid were added in order to stop further reaction and to break down the intermediate compound. The material was washed thoroughly and then steam distilled to remove excess phenol. The resulting product was a very thick, clear dark green oil consisting essentially of phenolated linseed oil, though probably the oil had been slightly polymerized.

The phenolated oil thus produced was submitted to the following further treatments:

(a) 100 parts by weight of phenolated oil were heated with 25 parts of a 40% solution of formaldehyde. No condensing agent was used. After about 30 minutes a black resin was formed which was not very hard. This was soluble in acetone and xylol but insoluble in linseed oil. A film made of the resin and baked for twenty-four hours at 100° C. was firmly adherent and flexible so that it could not be cracked off even though the sheet to which it had been applied was bent 180°.

(b) 100 parts by weight of the phenolated oil were heated with 10 parts of paraformaldehyde and 6 parts of hydrochloric acid (sp. gr. 1.2). After about 15 minutes' heating at 150° C. a dark red resin was formed. This was quite hard but in other respects was quite similar to the resin described under (a).

(c) 100 parts of the phenolated oil were heated with 50 parts of 40% formaldehyde solution and 10 parts of 38% aqueous ammonia. The reaction of condensation progressed slowly so that it could be stopped at any time. As the reaction continued, the material gradually thickened, and a distinct color change took place, for whereas the oil was a dark green, the resin formed was a light yellowish brown which did not darken on further heating. After about 2½ hours a very brittle resin was formed. Samples of the resin selected at various stages were found to be soluble in the thinners used for nitrocellulose lacquers and in xylene and turpentine but were insoluble in naphtha and linseed oil.

2. 300 parts by weight of linseed oil were dissolved in 75 parts of ether and cooled to 0° C. by means of brine. To this solution 135 parts by weight of anhydrous aluminum chloride were added in small amounts, the mixture being agitated mechanically. To this was added slowly 225 parts by weight of cresol and the resulting mixture agitated for several hours while being maintained cool. The temperature was then raised to about 30° C. and the mixture agitated for several hours more. Hydrochloric acid was evolved and the product became a deep dark red color.

1200 parts of 15% sulphuric acid solution were then added in order to stop further reaction and to break down the intermediate product. The material was washed thoroughly. It was a very thick, clear, dark green oil consisting essentially of cresolated linseed oil.

100 parts of the cresolated oil were heated with 35 parts of 40% formaldehyde solution and 15 parts of 38% aqueous ammonia. After about two hours' heating, a clear light-red resin was formed soluble in xylol, turpentine and in lacquer thinners.

3. 225 parts by weight of cresol were dissolved in 75 parts of ether and cooled to 0° C. by means of cold brine. To this solution 135 parts by weight of anhydrous aluminum chloride were added slowly, the mixture being agitated mechanically. To this was added slowly, 300 parts by weight of linseed oil which had previously been cooled to 0° C. The resulting mixture was agitated for several hours at 0° C. The temperature was then raised to about 35° C. where further reaction took place causing the temperature to rise to about 80° C., though the source of heat was removed. When the resulting mass had eventually cooled to room temperature, 1200 parts of 15% sulphuric acid was added to stop further reaction and to break down the intermediate product. The material was washed thoroughly and was a very thick dark green oil.

100 parts of the cresolated oil were heated with 25 parts of 40% formaldehyde solution and 10 parts of 38% aqueous ammonia under a reflux condenser for about an hour. The water was then evaporated leaving a clear light colored red resin soluble in xylol, turpentine, and lacquer solvents.

Following these types of procedure, other compounds of drying oils and polar aromatic bodies can be produced and reacted on in various ways as recognized in the science of chemistry.

While we have referred in this application solely to aluminum chloride, it is recognized that certain other metallic chlorides such as iron chloride may be employed in its stead and as an equivalent.

This application is a continuation in part of our earlier application, Ser. No. 532,986, filed April 25, 1931.

What we claim is:

1. The process of producing intermediate oils which comprises reacting on an oily body consisting essentially of combined fatty acid radicals of a vegetable origin having from 16 to 24 carbon atoms and having non-conjugated double bonds and selected from the group consisting of the fatty acids and the esters of such fatty acids formed with a polyhydric alcohol, with an aromatic compound of the type capable of being combined with an aliphatic body by the Friedel and Craft reaction, in the presence of aluminum chloride present in an amount equal to at least 20% by weight of the oily body, while maintaining the reaction temperature below 35° C. at least until a substantial evolution of HCl has taken place and subsequently hydrolyzing the reaction products with a weak acid and washing to remove aluminum salts.

2. A process as specified in claim 1, in which the aromatic body is diluted with a volatile, substantially inert solvent.

3. A process as specified in claim 1, in which the reaction during the early stages as specified is maintained at a temperature below 10° C.

4. A process as specified in claim 1, in which a substantial excess of the aromatic compound is used and the excess is distilled off after the reaction is substantially completed.

5. A process as specified in claim 1, in which the aluminum chloride is present in a proportion approximately equal to one mol. for each unsaturated fatty acid chain present.

6. The method of forming a soluble resinous body which comprises reacting a vegetable drying oil having non-conjugated double bonds with a phenol in the presence of anhydrous aluminum chloride equal to at least about 40% by weight of the drying oil, maintaining the temperature below 35° C. until a substantial reaction has taken place, hydrolyzing with a weak acid, separating out unreacted phenol and metallic salts and reacting with formaldehyde in the presence of a catalyst.

JAMES SCOTT LONG.
GEORGE F. BEAL.